United States Patent
Hupka et al.

(10) Patent No.: US 9,399,705 B2
(45) Date of Patent: *Jul. 26, 2016

(54) STORAGE-STABLE POLYURETHANE-PREPREGS AND FIBRE COMPOSITE COMPONENTS PRODUCED THEREFROM

(71) Applicant: Bayer Intellectual Property GmbH, Monheim (DE)

(72) Inventors: Florian Hupka, Düsseldorf (DE); Marcel Schornstein, Neuss (DE); Dirk Wegener, Monheim (DE); Harald Rasselnberg, Dormagen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/386,030

(22) PCT Filed: Mar. 15, 2013

(86) PCT No.: PCT/EP2013/055413
§ 371 (c)(1),
(2) Date: Sep. 18, 2014

(87) PCT Pub. No.: WO2013/139704
PCT Pub. Date: Sep. 26, 2013

(65) Prior Publication Data
US 2015/0080530 A1  Mar. 19, 2015

(30) Foreign Application Priority Data

Mar. 20, 2012 (EP) .................................. 12160307
Oct. 19, 2012 (EP) .................................. 12189155

(51) Int. Cl.
 *C08J 5/24* (2006.01)
 *C08G 18/58* (2006.01)
 *C08G 18/76* (2006.01)
 *C08G 18/42* (2006.01)
 *C03C 25/12* (2006.01)
 *C03C 25/32* (2006.01)

(52) U.S. Cl.
 CPC . *C08J 5/24* (2013.01); *C03C 25/12* (2013.01); *C03C 25/326* (2013.01); *C08G 18/4238* (2013.01); *C08G 18/58* (2013.01); *C08G 18/7664* (2013.01); *C08J 2375/04* (2013.01); *C08J 2375/06* (2013.01)

(58) Field of Classification Search
 CPC ....... C08G 18/10; C08G 18/12; C07D 493/04
 See application file for complete search history.

(56) References Cited

U.S. PATENT DOCUMENTS

| 4,443,563 A * | 4/1984 | Dirlikov et al. ............... 521/174 |
| 4,564,645 A * | 1/1986 | Salzburg et al. .............. 521/159 |
| 4,797,320 A * | 1/1989 | Kopp et al. ................ 428/316.6 |
| 2004/0231598 A1 | 11/2004 | Werner |
| 2008/0099141 A1* | 5/2008 | Booth et al. ................ 156/331.7 |
| 2008/0265201 A1 | 10/2008 | Spyrou et al. |
| 2009/0146463 A1* | 6/2009 | Schleiermacher et al. ... 296/210 |
| 2009/0171060 A1 | 7/2009 | Gerkin et al. |
| 2011/0281117 A1* | 11/2011 | Ortelt et al. .................... 428/418 |
| 2012/0003890 A1 | 1/2012 | Schmidt et al. |
| 2013/0045652 A1* | 2/2013 | Schmidt et al. ............... 442/169 |
| 2013/0244520 A1 | 9/2013 | Lindner et al. |
| 2014/0065911 A1 | 3/2014 | Schmidt et al. |
| 2014/0087196 A1* | 3/2014 | Lindner et al. ............ 428/423.1 |
| 2015/0050503 A1* | 2/2015 | Hupka et al. ............... 428/425.6 |
| 2015/0080530 A1* | 3/2015 | Hupka et al. .................. 524/871 |

FOREIGN PATENT DOCUMENTS

| DE | 102009001806 A1 | 9/2010 |
| DE | 102009001793 A1 | 10/2010 |
| DE | 102010029355 A1 | 12/2011 |
| EP | 590702 A1 | 4/1994 |
| JP | 2004196851 A | 7/2004 |
| WO | WO-9850211 A1 | 11/1998 |
| WO | WO-03082944 A1 | 10/2003 |
| WO | WO-03101719 A2 | 12/2003 |
| WO | WO-2006043019 A1 | 4/2006 |
| WO | WO-2008138855 A1 | 11/2008 |
| WO | WO-2012022683 A1 | 2/2012 |

OTHER PUBLICATIONS

International Search Report for PCT/EP2013/055413 mailed May 24, 2013.

* cited by examiner

*Primary Examiner* — Michael A Salvitti
(74) *Attorney, Agent, or Firm* — Drinker Biddle & Reath LLP

(57) ABSTRACT

The invention relates to storage-stable prepregs (preimpregnated fibers) based on low-viscosity polyurethane systems having a very high characteristic number and flat fiber composite components (molded bodies; composite components) produced therefrom, which are obtained due to an impregnation method of fiber reinforced materials such as woven fabrics and fleece, and to a method for the production thereof.

7 Claims, No Drawings

STORAGE-STABLE POLYURETHANE-PREPREGS AND FIBRE COMPOSITE COMPONENTS PRODUCED THEREFROM

CROSS-REFERENCE TO RELATED APPLICATIONS

This application is a national stage application (under 35 U.S.C. §371) of PCT/EP2013/055413, filed Mar. 15, 2013, which claims benefit of European Applications No. 12160307.1, filed Mar. 20, 2012 and No. 12189155.0, filed Oct. 19, 2012, all of which are incorporated herein by reference in their entirety.

The present invention relates to storage-stable prepregs (preimpregnated fibers) based on low-viscositypolyurethane systems with very high index, and to fiber-composite components (composite components, moldings) produced therefrom, these being obtainable via impregnation processes from fiber-reinforced materials such as woven fabrics and laid scrims, and also to a process for production of these.

Fiber-reinforced materials in the form of prepregs are already used in many industrial applications because they are convenient to handle and because of increased processing efficiency in comparison with the alternative wet lamination technology ("wet-lay-up" technology).

Demands of industrial users of systems of this type are not only good handling but also longer shelf lives at room temperature and shorter cycle times, and prepreg-hardening temperatures that are low and more energy-efficient.

This requires matrix components that permit the production of prepregs that can be stored and that have properties sufficiently stable for further processing. To this end, the prepregs cannot be tacky, but nor can they have been fully hardened: instead it is necessary that the resin matrix has been merely prepolymerized, i.e. it must remain fusible. Requirements placed upon the crosslinked resin matrix consist in a high level of adhesion at interfaces in respect of the reinforcing materials and insert components, and where appropriate also in respect of other materials, for example metallic or ceramic materials. In the crosslinked state there are also requirements for high chemical stability and heat resistance.

Alongside polyesters, vinyl esters, and epoxy systems there are many specialized resins in the field of crosslinking matrix systems. Among these are also polyurethane resins, which are used by way of example for the production of composite materials by way of SRIM (structural reaction injection molding) processes or pultrusion processes because they are tough, damage-tolerant, and robust. Polyurethane composites also have superior toughness in comparison with vinyl esters, unsaturated polyester resins (UPE), or UPE-urethane hybrid resins.

Prepregs and composite components produced therefrom, based on epoxy systems, are described by way of example in WO98/50211.

WO2006/043019 describes a process for the production of prepregs based on epoxy resin polyurethane powders.

DE-A 102010029355 describes a process for the production of storage-stable polyurethane prepregs, and describes moldings produced therefrom, these being obtainable via a direct-melt-impregnation process from fiber-reinforced materials with use of reactive polyurethane compositions. The in essence aliphatic polyisocyanates used here are either internally blocked (e.g. as uretdione) and/or blocked by external blocking agents. The reactive resin mixtures can be used at temperatures of from 80 to 120° C. in the direct-melt-impregnation process. The disadvantage is that the hardening temperature is from 120° C. to 200° C., depending on the system, and the hardening time/cycle time is very long, being up to 60 minutes, with resultant high energy costs and high production costs. The examples use a leveling additive, and it can therefore be assumed that the systems described have high viscosities.

There are also known prepregs based on pulverulent thermoplastics as matrix. US 20040231598 describes a method in which the particles are passed through a specific acceleration chamber with electrostatic charging. This apparatus serves for the coating of glass substrates, aramid substrates, or carbon-fiber substrates for the production of prepregs from thermoplastic resins. Resins mentioned are polyethylene (PE), polypropylene (PP), polyetheretherketone (PEEK), polyether sulfone (PES), polyphenyl sulfone (PPS), polyimide (PI), polyamide (PA), polycarbonate (PC), polyethylene terephthalate (PET), polyurethane (PU), polyester, and fluoropolymers. The thermoplastic prepreg textiles produced therefrom exhibit inherent toughness, good, viscoelastic damping behavior, unrestricted shelf life, good chemicals resistance, and recyclability.

Composite components with a matrix based on 2-component polyurethanes (2-C PUR) are likewise known. The 2-C PUR category comprises in essence the traditional reactive polyurethane resin systems. In principle, the system has two separate components. Whereas the main constituent of one of the components is always a polyisocyanate, the main constituents of the second component are polyols or amino- or amine-polyol mixtures. The two parts are mixed with one another only briefly prior to processing. The chemical hardening reaction then takes place via polyaddition with formation of a network made of polyurethane or polyurea. 2-C systems have a restricted processing time (potlife) after the mixing of the two constituents, since the exothermic reaction that begins leads to gradual viscosity increase and finally to the gelling of the system. There are numerous variables here that determine the effective time available for processing: reactivity of the reactants, catalysis, concentration, solubility, moisture content, NCO/OH ratio, and ambient temperature being the most important [Lackharze [Coating resins], Stoye/Freitag, Hauser-Verlag 1996, pp. 210/212]. The disadvantage of the prepregs based on 2-C PUR systems of this type is that there is only a short time available for the processing of the prepreg to give a composite. Prepregs of this type are therefore not storage-stable over a plurality of hours, or indeed days.

JP-A 2004196851 describes composite components which are produced from carbon fibers and from organic fibers, e.g. hemp, with use of a matrix made of 2-C PUR based on polymeric methylenediphenyl diisocyanate (MDI) and on specific compounds containing OH groups.

WO 2003/101719 describes polyurethane-based composite components and methods for producing same. 2-C polyurethane resins are involved, with defined viscosities in the range from 300 to 2000 mPas, and with particular gel times of from 3 to 60 minutes.

There are also known physically-drying systems based on non-reactive PUR elastomers. Relatively high-molecular-weight, linear, thermoplastic polyurethanes are involved here, derived from diols and from diisocyanates, preferably MDI, TDI, HDI, and IPDI. These thermoplastic systems generally have very high viscosities, and therefore also have very high processing temperatures. This greatly increases the difficulty of use for prepregs. The use of powders in reactive systems in the production of prepregs with fiber composites is rather unusual, and has hitherto been restricted to a small number of application sectors.

Probably the most commonly used process for applying a powder to a fiber surface is the fluidized bed process (fluidized bed impregnation). Powder particles subjected to an upward-directed flow pattern assume fluid-like properties. This method is used in EP-A 590702. Here, individual fiber bundles are opened to release the strands, which are coated with the powder in the fluidized bed. The powder here is composed of a mixture of reactive and thermoplastic powder, in order to optimize the properties of the matrix. Individual rovings (fiber bundles) are finally brought together, and a plurality of layers are pressed for about 20 minutes at a pressure of 16 bar. The temperatures vary between 250 and 350° C. However, irregular coating is frequently encountered in the fluidized-bed process, in particular when the strands are not completely separated from one another.

In this connection, US-A 20040231598 presents a method which functions similarly to the fluidized bed process. Here, an air stream transports the particles to the substrate, and a specific structure is used for uniform deposition of the powder.

DE-A 102009001793 and DE-A 102009001806 describe a process for the production of storage-stable prepregs in essence composed of at least one fibrous support and of at least one reactive pulverulent polyurethane composition as matrix material.

WO 2012/022683 describes fiber-composite components and a process for production of these. The polyurethane used to saturate the fiber layer is produced from a reaction mixture. The reaction mixture comprises, as essential constituent, one or more polyepoxides, alongside polyisocyanates, polyols, and optionally additives. The polyurethane disclosed in said application has the disadvantage of shelf life that is not adequate for the production of prepregs, being characterized by way of example by a low glass transition temperature. This system moreover does not have the NCO value required for postcrosslinking to give finished components.

It was an object of the present invention to find a matrix material which has very low viscosity in order to ensure good wetting of the fibrous support, and which has sufficiently long processing time between the mixing of the components and the impregnation of the reinforcing fibers by the as yet not fully reacted matrix material. Another object of the invention was to provide prepregs which can be produced by means of a simple process, are storage-stable at room temperature for a plurality of weeks, have low hardening temperatures, and harden rapidly, so that short cycle times are obtained. The prepregs are moreover intended to be almost tack-free, so that they can easily be further processed.

Surprisingly, it has been found that production of prepregs that are storage-stable but nevertheless reactive is achieved via impregnation of reinforcing fibers with a polyurethane system with high index with very low viscosity, where said prepregs, unlike existing prepreg systems, harden extremely rapidly. When the prepregs of the invention are compared with the prepregs described in DE-A 102010029355 (WO 2011/147688), they have improved processing properties and shorter cycle times.

The invention therefore provides prepregs comprising a sheet-like fiber layer saturated with polyurethane (matrix material) that has not been fully hardened and that has an NCO value of from 8% by weight to 16% by weight, and that has a $T_g$-value below 40° C., preferably not more than 35° C. (measured in accordance with DIN EN ISO 53765-A-20), where the polyurethane is obtainable from a reaction mixture composed of A) one or more di- and/or polyisocyanates from the group consisting of aromatic di- and/or polyisocyanates and polymeric homologs of these, and also blends thereof B) a polyol component made of one or more polyols with an average OH number of from 30 to 1000 mg KOH/g, with an average functionality of from 1.9 to 2.5

C) one or more dianhydrohexitols

D) one or more latent catalysts which are catalytically active at temperatures of from 50° to 100° C.

E) optionally auxiliaries and/or additives, other than polyepoxides where the initial viscosity of the reaction mixture at 40° C. is from 30 to 500 mPas (measured in accordance with DIN EN ISO 53019), preferably from 70 to 250 mPas, particularly preferably from 70 to 150 mPas, and the ratio of the number of the NCO groups in component A) to the number of the OH groups in component B) is preferably from 1.35:1 to 10:1, particularly preferably from 1.4:1 to 5.0:1.

The NCO value of the polyurethane that has not been fully hardened gives the proportion by weight of unreacted isocyanate groups in the polyurethane. The NCO value is determined over a period of a plurality of weeks. This NCO value is moreover an indicator of the shelf life of the prepregs.

The NCO value of the storage-stable prepregs is determined weekly over a period of 7 weeks. The NCO value of the prepregs of the invention is in a range from 8% by weight to 16% by weight, preferably from 10% by weight to 16% by weight, and very particularly preferably from 10% by weight to 14% by weight. Even without addition of external blocking agents or what are known as stoppers, the NCO value of the prepregs of the invention changes very little over a period of 7 weeks. The NCO value is determined in accordance with DIN EN ISO 14896:2009-07 Method A.

The invention further provides sheet-like fiber-composite components comprising at least one prepreg of the invention, where the prepreg(s) has/have been fully hardened.

The present invention further provides a process for the production of the prepregs of the invention which is characterized in that i) components B) to E) are mixed at temperatures from 40° to 80° C., preferably from 50° to 70° C., to produce a polyol formulation X, ii) the polyol formulation X from step i) is mixed with component A) at temperatures from 10° to 80° C. to produce a reactive mixture, iii) the reactive mixture from ii) is applied to a sheet-like fiber layer and to some extent cured.

The fiber layer is therefore impregnated by the reactive mixture.

The invention further provides a process for the production of the fiber-composite components of the invention which is characterized in that one or more prepregs produced in the invention is/are fully hardened at from 110° to 140° C. and at a pressure of from 1 to 100 bar, preferably from 1 to 50 bar, and particularly preferably from 1 to 10 bar or in vacuo within from 1 to 4 minutes, preferably from 1 to 3 minutes.

The viscosities are determined in accordance with DIN EN ISO 53019 (plate-on-plate).

The prepregs of the invention or the fiber-composite components produced therefrom can be used in various applications in the construction industry, the automobile industry (e.g. bodywork components), the aerospace industry (aircraft construction), road construction (e.g. manholes), power engineering (wind turbines; e.g. rotor blades), in boat building and ship building, and in structures exposed to high loads.

The essence of the principle of the impregnation process for the production of the prepregs is that a reactive polyurethane composition is first produced from the individual components A), B), C), D), and E). Components B), C), D), and E) are mixed in advance at from 40 to 80° C. to give a polyol formulation. The homogeneous mixture is then mixed with component A) at temperatures below 80° C. (preferably from 10° to 75° C.). This reactive polyurethane composition is then applied directly at room temperature to the fibrous support (sheet-like fiber layer), i.e. the fibrous support is impregnated by the polyurethane system produced from A), B), C), D), and E). The storage-stable prepregs can then be further processed at a subsequent juncture to give fiber-composite components. Very good impregnation of the fibrous support is achieved by the very low-viscosity polyurethane system of the invention. Any further crosslinking reaction due to heating of the polyurethane composition is avoided because the operations take place at room temperature. The impregnation process can use various methods. By way of example, the polyurethane system can be applied on a roll mill or by means of a doctor.

An advantage of the reaction mixtures used in the invention is the mixing of component A) with the mixture of B), C), D), and E) at low temperatures of from 10° C. to 80° C., preferably of from 20° C. to 60° C., and particularly preferably of from 20° C. to 40° C., in such a way as to avoid any cumulative exothermic effect, and to maintain low viscosity of the reaction mixture, and thus to permit successful application of the reaction mixture to the support material. In the systems used hitherto, it is necessary to mix the components at temperatures at from 80° C. to 120° C., and this is problematic because the reactive matrix material begins to react.

The reaction mixtures used in the invention are unlike the reaction mixtures used in DE-A 102010029355 in requiring neither external blocking agents nor blocked isocyanate components.

The reaction mixtures used in the invention permit rapid hardening of the prepregs at low temperatures and rapid manufacture of the fiber-composite components.

The reaction mixture used in the invention can be produced in casting machines with static mixers or with dynamic mixers, since only a short mixing time is required. This is a major advantage in the production of the fiber-composite components of the invention, because for good saturation of the reactive resin mixture has to have minimum viscosity. A mixture which requires some minutes for prior mixing already has too high a viscosity, due to the formation of urethane groups.

The prepregs produced in the invention have, after cooling to room temperature, a very long shelf life of a plurality of weeks at room temperature. The prepregs thus produced are almost tack-free, and can therefore easily be further processed.

The shelf life of the prepregs is determined by determining the NCO value over a period of a plurality of weeks. The NCO value gives the proportion by weight of isocyanate groups in the isocyanate mixture or in the prepolymer.

The NCO value of the storage-stable prepregs is determined weekly over a period of 7 weeks. The NCO value of the prepregs of the invention is in the range from 8% by weight to 16% by weight, preferably from 10% by weight to 16% by weight, and very particularly preferably from 10% by weight to 14% by weight. Even without addition of external blocking agents or what are known as stoppers, the NCO value of the prepregs of the invention is within the stated ranges over a period of 7 weeks. The NCO value [in % by weight] is determined in accordance with DIN EN ISO 14896:2009-07 Method A.

DE-A 102010029355 describes the addition of a leveling additive, and it can therefore be assumed that the reactive resin systems have high viscosity. The polyurethane systems of the invention have very low viscosities of from 30 to 500 mPas at 40° C., and it is therefore unnecessary to add leveling additives, and good saturation of the fibers is nevertheless achieved.

Another advantage of the reaction systems used in the invention is that use of aromatic polyisocyanates gives fiber-composite components with high glass transition temperatures of more than 130° C., and that hardening is possible at low temperatures.

The prepregs can be processed in the form of a layer and in the form of a plurality of mutually superposed layers, to give a fiber-composite component. Prior to the crosslinking of the matrix material, the prepregs are preferably cut to size, optionally stitched or otherwise fixed, and pressed in a suitable mold at superatmospheric or atmospheric pressure, or optionally with application of vacuum. For the purposes of the present invention, this procedure for the production of the fiber-composite components from the prepregs takes place at temperatures below 140° C., preferably from 110° to 140° C., particularly preferably from 110° to 135° C., as required by hardening time.

During the processing of the prepregs to give the fiber-composite components (e.g. via pressing at elevated temperatures), very good impregnation of the fibrous reinforcing material takes place, due to melting of the, initially incipiently reacted, matrix material to give a low-viscosity polyurethane composition, before the entire polyurethane matrix cures as a result of the full crosslinking reaction of the polyurethane composition at elevated temperatures. It is preferable that a release agent is provided to the mold cavity prior to the pressing of the prepreg. It is possible to introduce other protective or decorative layers, for example one or more gelcoat layers, into the mold before the fiber material is introduced for the production of the prepreg.

Particular preference is given to a fiber-composite component which comprises, in the fiber layer, a polyurethane obtainable from from 50 to 80% by weight, preferably from 65 to 75% by weight, of polyisocyanates (A), from 15 to 30% by weight, preferably from 18 to 25% by weight, of polyols (B), from 5 to 15% by weight, preferably from 8 to 12% by weight, of dianhydrohexitols (C), from 0.1 to 3% by weight, preferably from 0.3 to 1.2% by weight, of catalyst (D), and from 0 to 3% by weight, preferably from 0.1 to 0.5% by weight, of additives (E), where the sum of the proportions by weight of components is 100% by weight.

The proportion of fiber in the fiber-composite part is preferably more than 45% by weight, with particular preference more than 50% by weight, based on the total weight of the fiber-composite component.

The usual aromatic di- and/or polyisocyanates are used as polyisocyanate component A). Examples of these suitable polyisocyanates are phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI), and/or higher homologs (pMDI), 1,3- and/or 1,4-bis(2-isocyanatoprop-2-yl)benzene (TMXDI), 1,3-bis (isocyanatomethyl)benzene (XDI). It is preferable to use, as isocyanate, diphenylmethane diisocyanate (MDI), and in particular a mixture of diphenylmethane diisocyanate and polyphenylene polymethylene polyisocyanate (pMDI). Mixtures of diphenylmethane diisocyanate and polyphenylene polymethylene polyisocyanate (pMDI) have a preferred monomer content of from 60 to 100% by weight, preferably from 70 to 95% by weight, particularly preferably from 80 to 90% by weight. The NCO content of the polyisocyanate used should preferably be above 25% by weight, with preference above 30% by weight. The viscosity of the isocyanate should preferably be ≤250 mPas (at 25° C.), with preference ≤100 mPas (at 25° C.), and with particular preference ≤30 mPas (at 25° C.).

If a single polyol is added, the OH number of component B) gives the OH number thereof. In the case of mixtures, the OH number of the mixture is stated. This value can be determined with reference to DIN EN ISO 53240.

The average OH number of the polyol component (polyol or polyol mixture) B) is from 30 to 1000 mg KOH/g, preferably from 50 to 300 mg KOH/g, and particularly preferably from 60 to 250 mg KOH/g. The average functionality of the polyol component used is preferably from 1.9 to 2.5.

It is possible in the invention to use polyether polyols, polyester polyols, or polycarbonate polyols as polyol component B), preference being given to polyester polyols. Examples of polyester polyols that can be used in the invention are condensates of 1,4-butanediol, ethylene glycol, and adipic acid.

Polyol component B) can also comprise fibers, fillers, and polymers.

Dianhydrohexitols can by way of example be produced via elimination of two molecules of water from hexitols, e.g. mannitol, sorbitol, and iditol. These dianhydrohexitols are known as isosorbide, isomannide, and isoidide, and have the following formula:

Isosorbide, 1,4:3,6-dianhydro-D-glucitol:

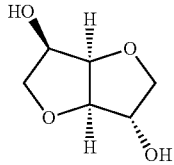

Isomannide, 1,4:3,6-dianhydro-D-mannitol:

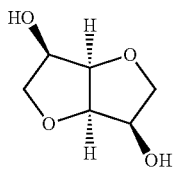

Isoidide, 1,4:3,6-dianhydro-L-iditol:

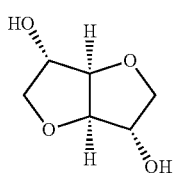

Particular preference is given to isosorbide. Isosorbide is obtainable by way of example as Polysorb® P from Roquette, or as Addolink® 0312 from Rhein Chemie. It is also possible to use mixtures of the abovementioned compounds.

As latent catalysts D) it is preferable to use catalysts which are catalytically active in the range from 50° C. to 100° C. Examples of typical latent catalysts are blocked amine and amidine catalysts from the producers Air Products (e.g. Polycat® SA-1/10, Dabco KTM 60) and Tosoh Corporation (e.g. Toyocat® DB 2, DB 30, DB 31, DB 40, DB 41, DB 42, DB 60, DB 70). However, it is also possible to use any of the other, typical latent catalysts from polyurethane chemistry with what is known as a switch temperature of from 50° C. to 100° C.

Auxiliaries and/or additives E) can optionally be added. These are by way of example deaerators, antifoams, release agents, fillers, flow aids, organic or inorganic dyes, blowing agents, and reinforcing materials. Other known additives and additions can be used if necessary. Polyepoxides are not used.

Fiber material used can be sized or unsized fibers, for example glass fibers, carbon fibers, metal fibers (e.g. steel fibers or iron fibers), natural fibers, aramid fibers, polyethylene fibers, basalt fibers, or carbon nanotubes (CNTs). Carbon fibers are particularly preferred. The fibers can be used as short fibers of length from 0.1 to 50 mm. Preference is given to continuous-filament-fiber-reinforced composite components obtained by using continuous fibers. The arrangement of the fibers in the fiber layer can be unidirectional, random, or woven. In components with a fiber layer made of a plurality of sublayers, there may be sublayer-to-sublayer fiber orientation. It is possible here to produce unidirectional fiber layers, cross-laid layers, or multidirectional fiber layers, where unidirectional or woven sublayers are mutually superposed. Particular preference is given to semifinished fiber products in the form of fiber material which is by way of example woven fabrics, laid scrims, braided fabrics, mats, nonwovens, knitted fabrics, or 3D semifinished fiber products.

The fiber-composite components of the invention can be used by way of example for the production of bodywork components of automobiles or in aircraft construction, or rotor blades of wind turbines, for the production of components for the construction of buildings or of roads (e.g. manhole covers), and of other structures exposed to high loads.

The invention will be explained in more detail with reference to the examples below.

EXAMPLES

Storage-stable prepregs made of the systems of the invention, made of polyisocyanates, polyols, additives, and latent catalysts, were produced and then hardened to give a fiber-composite component, and compared with prepregs/composite components made of polyurethane systems made of internally blocked polyisocyanate and polyol. For the production of the fiber-reinforced prepreg by impregnation, a thin film of the polyurethane system was applied to the glassfiber textile and distributed on the surface in such a way as to achieve about 55% by weight of glassfiber content, based on the subsequent component. The prepregs were then packed in a vacuum bag and stored at room temperature. The prepregs were removed from the bag and then pressed at 130° C. and 5 bar within a period of two minutes to give a fiber-composite component. The mechanical measurements were made on the fiber-reinforced test samples. Glassfiber content was determined via ashing of the test samples in accordance with DIN EN ISO 1172. Interlaminar shear resistance was determined in accordance with DIN EN ISO 14130.

The NCO/OH ratio gives the ratio of the number of NCO groups in polyisocyanate component A) to the number of OH groups in components B) and C).

Starting Compounds Used:

Component A): Desmodur® VP.PU 60RE11 (polyisocyanate from Bayer MaterialScience AG; mixture of diphenylmethane diisocyanate and polyphenylene polymethylene polyisocyanate; NCO-content 32.6% by weight; viscosity at 25° C.: 20 mPas)

Component B): linear polyester polyol made of adipic acid, ethylene glycol, and 1,4-butanediol, hydroxy number 86 mg KOH/g and functionality 2, viscosity at 25° C.: 250±50 mPas Component C): isosorbide (Addolink® 0312 from Rhein Chemie, hydroxy number 768 mg KOH/g, melting point from 60° C. to 63° C.)

Component D): Toyocat® DB 40: latent catalyst (blocked amine) from TOSOH Corporation Component E): internal release agent Edenor® Ti 05 from Cognis Deutschland, acid number 200 mg KOH/g, functionality 1

Glassfiber textile: HPT 1040-E0/3AC11, 90°/0° from SGL KÜMPERS GmbH & Co. KG, weight per unit area 1036 g/m$^2$ Measuring Equipment and Standards Used:

DSC: DSC Q 20 V24.8 Build 120 from Texas Instruments

Viscosimeter: MCR 501 from Anton Paar

DIN EN ISO 53019 (d/dt=60 l/s): d/dt=shear rate

DIN EN ISO 53765-A-20: A-20=determination of glass transition temperature with temperature change 20 kelvins/second DIN EN ISO 14896:2009-07 Method A: Method A=NCO value determination by means of titration Inventive Example 1

21.3 g of component C) were mixed with 42.5 g of component B), 1.5 g of Toyocat® DB 40, and 0.66 g of component E) at 70° C. 137.5 g of Desmodur® VP.PU 60RE11 were then added at room temperature and homogenized by a high-speed mixer. A thin film of this mixture was then applied to a glassfiber textile and distributed on the surface. The NCO value of the prepreg was 14.8% after 24 hours. The prepreg was then pressed at 130° C. and 5 bar to give a fiber-composite component.

Comparative Example 2

10.4 g of component C) were mixed with 20.9 g of component B), 0.75 g of Toyocat® DB 40, 0.33 g of component E), and 106.8 g of Eurepox® 710 (bisphenol A epichlorohydrin resin with average molar mass ≤700 g/mol; epoxy equivalent from 183 to 189 g/eq; viscosity at 25° C.: from 10 000 to 12 000 mPas) at 70° C. 67.6 g of Desmodur® VP.PU 60RE11 were then added at room temperature and homogenized by a high-speed mixer. Directly after mixing, the viscosity increased to about 5000 mPas, and it was therefore impossible to apply a thin film of this mixture to the glassfiber textile. The NCO value of the matrix was 4.9% after 60 minutes.

TABLE 1

| | Examples | | |
| --- | --- | --- | --- |
| | Inventive Example 1 | Comparative Example 2 | * |
| NCO/OH equivalent ratio | 2.95:1 | 1.1:1 | 1:1 |
| NCO/epoxide equivalent ratio | — | 1.1:1 | — |
| Viscosity at 40° C. (directly after mixing) [mPas]; measured in accordance with DIN EN ISO 53019 (d/dt = 60 1/s) | about 10 mPas | about 5000 | no homogeneous melt, since melting point of Fineplus ® PE 8078 >60° C. |
| Shelf life of prepreg [after days]; measured on the basis of the glass transition temperature $T_g$ [° C.] in accordance with DIN EN ISO 53765-A-20 | after 7 days: −21<br>after 14 days: −19<br>after 21 days −9<br>after 49 days: 0 | after 1 day: 49 | after 2 days: 50<br>after 17 days: 55<br>after 30 days: 56<br>after 47 days: 55 |
| NCO value of prepreg [after days]; measured in accordance with DIN EN ISO 14896: 2009-07 Method A [% by weight] | after 1 day: 14.8<br>after 7 days: 13.2<br>after 14 days: 12.9<br>after 21 days: 12.8<br>after 35 days: 12.1<br>after 42 days: 11.9<br>after 49 days: 11.7 | after 1 day: 4.4 | |
| Glass transition temperature of hardened matrix ($T_g$) [° C.] (without glass fiber) in accordance with DIN EN ISO 53765-A-20 | about 146 | about 60 | |
| Solidification time | 2 min at 130° C. | 30 sec at room temperature | 30 min; during this time, the temperature is raised from 90° C. to 170° C. |
| Glassfiber content [% by weight] in accordance with DIN EN ISO 1172 | 55 | — | >50 |
| Interlaminar shear resistance 0° direction (short beam) [N/mm$^2$] in accordance with DIN EN ISO 3597-4 | 52 | — | 41 |

* Comparative data from DE-A 102010029355

The shelf life of the prepreg was determined both on the basis of the glass transition temperature ($T_g$) by means of DSC studies and also on the basis of the NCO value [in % by weight]. The values in the table show that the crosslinkability of the prepreg of the invention was not impaired by storage at room temperature over a period of 7 weeks.

The solidification time is the time required for full crosslinking of the polyurethane composition, such that no further enthalpy of reaction is detectable for the crosslinking reaction.

In comparative example 2 an appropriate quantity of Eurepox® 710 (bisphenol A epichlorohydrin resin with average molar mass ≤700 g/mol; epoxy equivalent from 183 to 189 g/eq; viscosity at 25° C.: from 10 000 to 12 000 mPas) was added to give an equivalent ratio of NCO groups to epoxy groups of 1.1:1. Directly after mixing and homogenization, the viscosity of the reaction mixture increased to about 5000 mPas. After 30 seconds, the matrix was almost solid. The high initial viscosity made it impossible to saturate the fibers. Glass transition temperature was 49° C. after as little as 24 hours, and the NCO value was below 4.4% by weight. Production of prepregs in the presence of epoxides was therefore impossible.

What is claimed is:

1. A prepreg comprising a sheet-like fiber layer saturated with polyurethane that has not been fully hardened and that has an NCO value of from 8% by weight to 16% by weight, and that has a $T_g$-value below 40° C. measured in accordance with DIN EN ISO 53765-A-20, where the polyurethane that has not been fully hardened is obtained from a reaction mixture comprising
    A) one or more di- and/or polyisocyanates selected from the group consisting of aromatic di- and/or polyisocyanates and polymeric homologs thereof, and blends thereof,
    B) a polyol component made of one or more polyols with an average OH number of from 30 to 1000 mg KOH/g measured in accordance with DIN EN ISO 53240, with an average functionality of from 1.9 to 2.5,
    C) one or more dianhydrohexitols,
    D) one or more latent catalysts which are catalytically active at temperatures of from 50° C. to 100° C., and
    E) optionally auxiliaries and/or additives, other than polyepoxides;
    where the initial viscosity of the reaction mixture at 40° C. is from 30 to 500 mPas measured in accordance with DIN EN ISO 53019, and the ratio of the number of the NCO groups in component A) to the number of the OH groups in component B) is from 1.35:1 to 10:1.

2. The prepreg as claimed in claim 1, wherein the amount present of component C) is from 5 to 15% by weight, based on components A) to E).

3. The prepreg as claimed in claim 1, wherein the fiber layer is composed of fibrous material made of glass, carbon, synthetic polymers, metal fibers, natural fibers, mineral fibers, or ceramic fibers, or a mixture thereof.

4. A sheet-like fiber-composite component comprising at least one prepreg as claimed in claim 1, where the prepreg has been fully hardened.

5. A process for the production of prepregs as claimed in claim 1, wherein
    i) components B) to E) are mixed at temperatures from 40° to 80° C. to produce a polyol formulation X,
    ii) the polyol formulation X from step i) is mixed with component A) at temperatures from 10° to 80° C. to produce a reactive mixture, and
    iii) the reactive mixture from ii) is applied to a sheet-like fiber layer and to some extent cured.

6. The process according to claim 5, wherein components B) to E) are mixed at temperatures from 50° to 70° C.

7. A process for the production of fiber-composite components as claimed in claim 4, wherein one or more prepregs is or are fully hardened at from 110° to 140° C. and at a pressure of from 1 to 100 bar or in vacuo within from 1 to 4 minutes.

* * * * *